United States Patent
Mattice et al.

(10) Patent No.: US 7,556,488 B2
(45) Date of Patent: Jul. 7, 2009

(54) VERTICAL WHEEL MACHINE AND METHOD FOR COMPRESSION MOLDING SEALING LINERS

(75) Inventors: Daniel L. Mattice, Columbia City, IN (US); Wendell D. Willingham, Perrysburg, OH (US)

(73) Assignee: Rexam Closure Inc., Perrysburg, OH (US)

( * ) Notice: Subject to any disclaimer, the term of this patent is extended or adjusted under 35 U.S.C. 154(b) by 778 days.

(21) Appl. No.: 11/155,275

(22) Filed: Jun. 17, 2005

(65) Prior Publication Data

US 2006/0284339 A1 Dec. 21, 2006

(51) Int. Cl.
B29C 43/08 (2006.01)

(52) U.S. Cl. .................. 425/121; 425/123; 425/348 R; 425/345; 425/354; 425/809

(58) Field of Classification Search ................. 425/110, 425/113, 114, 121–128, 344–345, 348 R–349, 425/809
See application file for complete search history.

(56) References Cited

U.S. PATENT DOCUMENTS

| | | | |
|---|---|---|---|
| 3,210,805 A | 10/1965 | Mikihiko | |
| 3,439,718 A | 4/1969 | Wright et al. | |
| 3,635,612 A | 1/1972 | Fortin et al. | |
| 3,827,843 A | 8/1974 | Blouch | |
| 4,398,875 A | 8/1983 | Kawashima et al. | |
| 5,451,360 A | 9/1995 | Ingram | |
| 5,658,518 A | 8/1997 | Ingram | |
| 5,807,592 A | 9/1998 | Alieri | |
| 6,103,170 A | 8/2000 | Gregory | |
| 6,187,235 B1 | 2/2001 | Shapcott | |
| 6,306,330 B1 | 10/2001 | Cerny | |
| 6,368,094 B1 | 4/2002 | Dennis et al. | |
| 7,331,777 B2 * | 2/2008 | Mattice et al. | ........... 425/348 R |

FOREIGN PATENT DOCUMENTS

| | | |
|---|---|---|
| EP | 1101586 | 5/2001 |
| EP | 1155811 | 11/2001 |
| GB | 502977 | 3/1939 |

* cited by examiner

*Primary Examiner*—Yogendra Gupta
*Assistant Examiner*—Thu Khanh T Nguyen
(74) *Attorney, Agent, or Firm*—Reising Ethington P.C.

(57) ABSTRACT

An apparatus for compression molding sealing liners in premade closure shells includes a shell loader for presenting premade closure shells in sequence, a mold charge placement device for placing charges of liner material into the premade shells, and a vertical wheel molding machine for receiving the closure shells in sequence from the loader and compression molding the mold charges to form sealing liners within the closure shells. The vertical wheel molding machine preferably includes a wheel mounted for rotation around a horizontal axis and a plurality of angularly spaced molds disposed around the wheel. Each of the molds preferably includes a first mold segment and a second mold segment disposed radially outwardly of the first mold segment. One of the first and second mold segments, preferably the second mold segment, includes a nest for receiving a premade closure shell. The other of the first and second mold segments, preferably the first mold segment, includes a core for engaging and compression molding the mold charge of liner material within the shell.

33 Claims, 14 Drawing Sheets

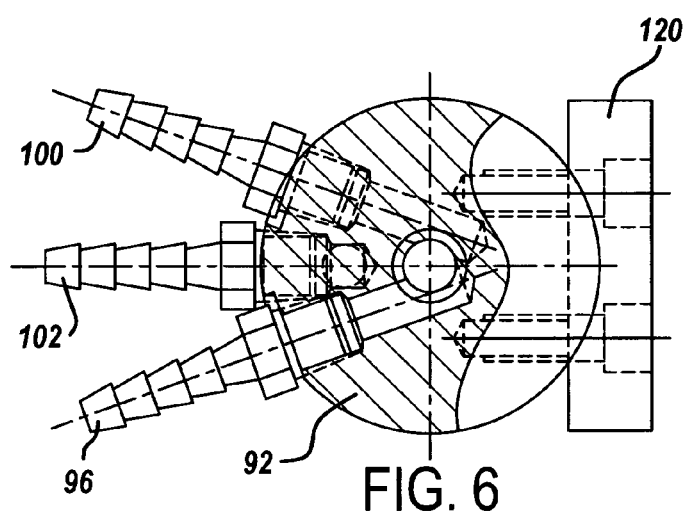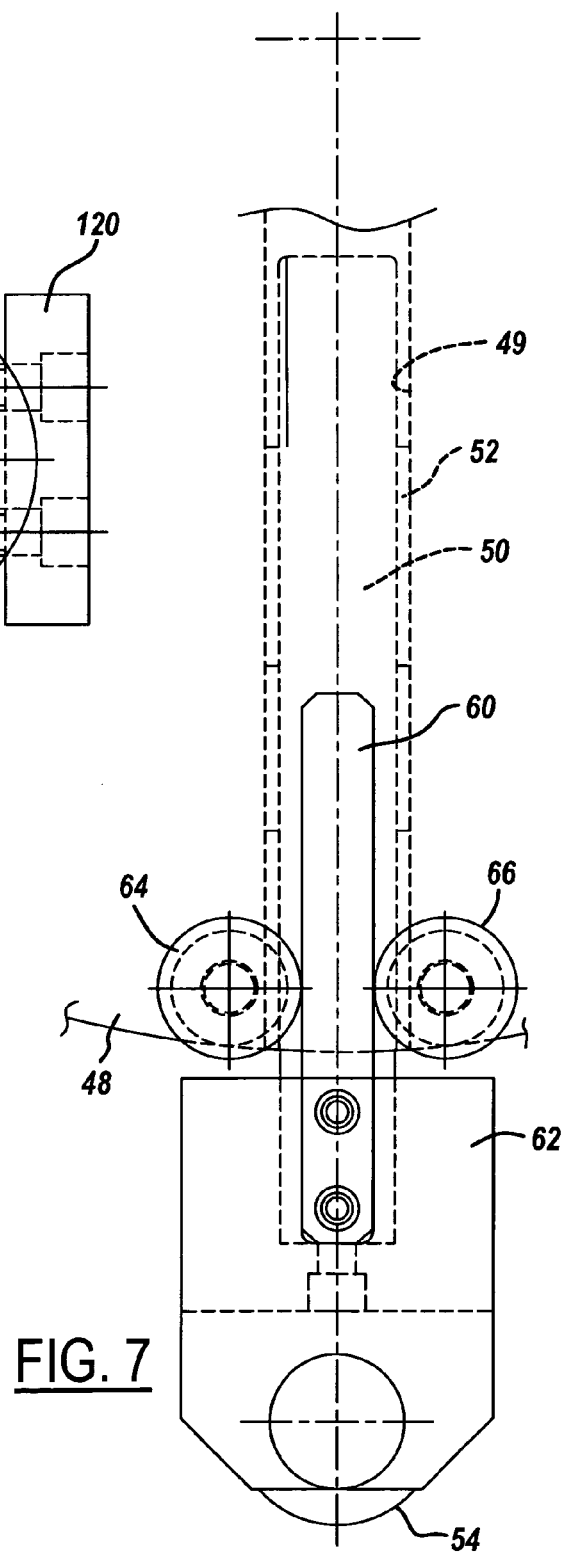

VERTICAL WHEEL MACHINE AND METHOD FOR COMPRESSION MOLDING SEALING LINERS

The present invention is directed to a vertical wheel machine and method for compression molding sealing liners within premade closure shells.

BACKGROUND AND SUMMARY OF THE DISCLOSURE

Machines for compression molding sealing liners within closure shells typically include a turret or carousel that rotates around a vertical axis. A plurality of molds are provided around the periphery of the carousel in the form of male and female mold sections that are aligned along vertical axes parallel to the axis of rotation. Cams drive one or both of the mold sections of each pair between an open position, in which a molded part is removed from the mold and a premade shell and a charge of plastic liner material are placed in the female mold section, and a closed position in which the male and female mold sections are brought together to compression mold the liner within the shell. A machine of this type is illustrated, for example, in U.S. Pat. No. 5,451,360.

Although vertical axis carousel-type machines of the noted type have enjoyed substantial commercial acceptance and success, innovation remains desirable. In particular, in vertical axis carousel-type machines, the weight of the rotating equipment is parallel to the vertical axis of rotation, creating a bending moment with respect to the axis of rotation and the bearings and shaft that support the carousel. Carousel-type machines also require a substantial amount of valuable floor space in a manufacturing facility. It is a general object of the present invention to provide an apparatus and method for compression molding sealing liners within premade closure shells that reduce the forces applied to the support frame and bearings, and/or reduce maintenance requirements and the amount of energy needed to operate the machine, and/or reduce the amount of floor space required per machine.

The present invention involves a number of aspects that can be implemented separately from or in combination with each other.

An apparatus for compression molding sealing liners in premade closure shells, in accordance with a first aspect of presently preferred embodiments of the invention, includes a shell loader for presenting premade closure shells in sequence, a mold charge placement device for placing charges of liner material into the premade shells, and a vertical wheel molding machine for receiving the closure shells in sequence from the loader and compression molding the mold charges to form sealing liners within the closure shells. The vertical wheel molding machine preferably includes a wheel mounted for rotation around a horizontal axis and a plurality of angularly spaced molds disposed around the wheel. Each of the molds preferably includes a first mold segment and a second mold segment disposed radially outwardly of the first mold segment. One of the first and second mold segments, preferably the second mold segment, is a female mold segment that includes a nest for receiving a premade closure shell. The other of the first and second mold segments, preferably the first mold segment, is a male mold segment that includes a core for engaging and compression molding the mold charge of liner material within the shell. In two disclosed embodiments of the invention, the mold charge of liner material either is placed within the premade closure shell prior to placement of the shell within the nest, or is placed within the shell after placement of the shell in the nest, preferably by placing the mold charge in a pocket on the mold core. The second mold segments preferably are moved radially inwardly and outwardly by at least one cam disposed adjacent to the wheel for engaging the second mold segments as the wheel rotates around its axis.

A method of compression molding sealing liners within premade closure shells, in accordance with another aspect of the invention, includes providing a wheel mounted for rotation around a horizontal axis and a plurality of angularly spaced molds disposed around the wheel. Each of the molds includes a first mold segment and a second mold segment disposed radially outwardly of the first mold segment. As the wheel is rotated around its horizontal axis, the second mold segments are moved in sequence radially with respect to the associated first mold segments between a radially inner closed position and a radially outer open position spaced from the associated first mold segment. With the mold segments in the open position, closure shells with compression molded sealing liners are removed from the mold, and a premade closure shell and mold charge of liner material are placed in the mold. The mold segments are then closed as the wheel rotates to compression mold the mold charge of liner material between the mold segments. In the disclosed embodiments of the invention, the mold charge of liner material is placed into the premade shells either before or after placing the shells into the molds.

BRIEF DESCRIPTION OF THE DRAWINGS

The invention, together with additional objects, features, advantages and aspects thereof, will best be understood from the following description, the appended claims and the accompanying drawings, in which:

FIG. 6 is a fragmentary sectional view taken substantially along the line 6-6 in FIG. 3;

FIG. 7 is a fragmentary elevational view taken from the direction 7 in FIG. 3;

DETAILED DESCRIPTION OF PREFERRED EMBODIMENTS

Figure 1:
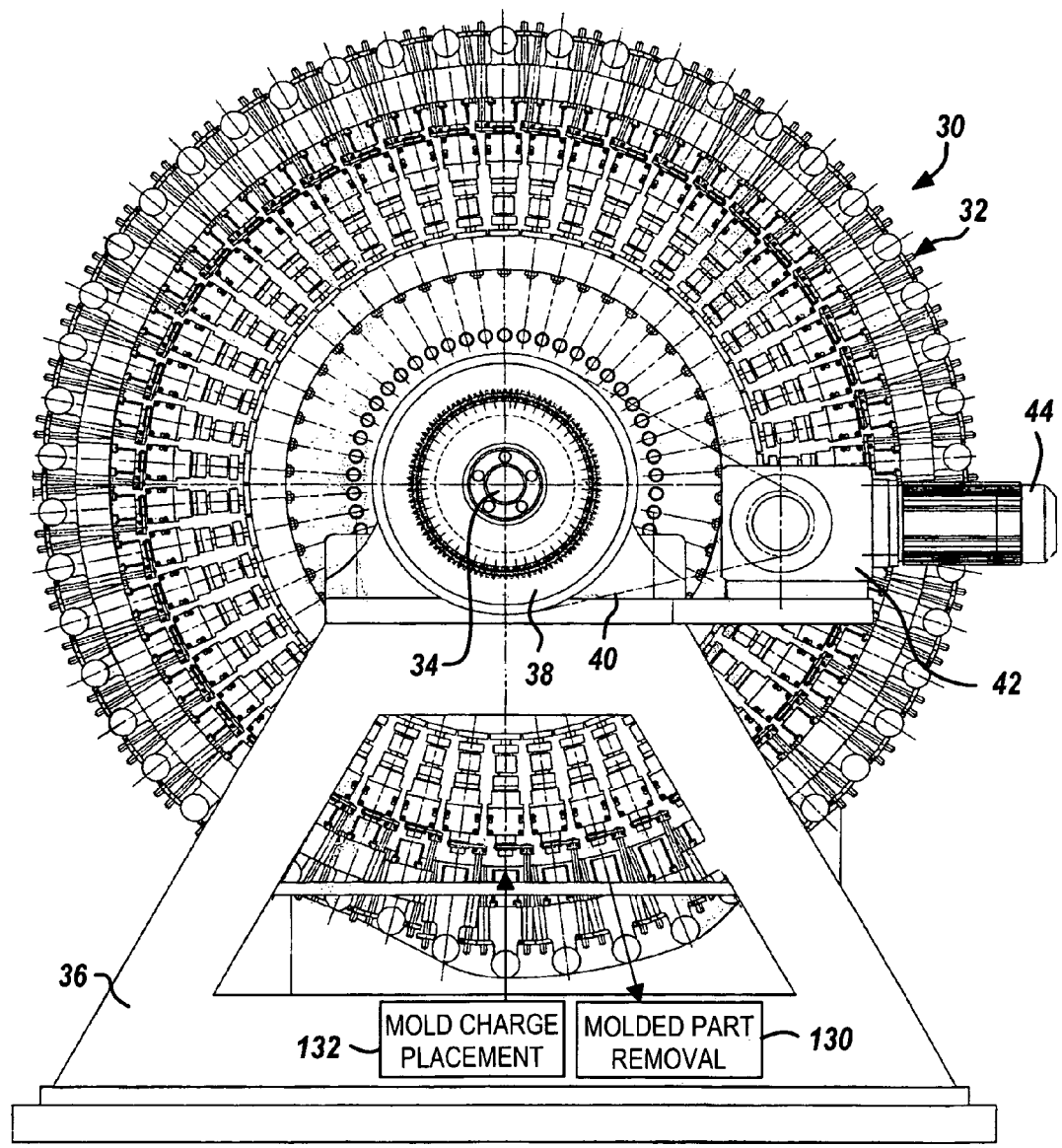
FIG. 1 is a side elevational view of a compression molding machine in accordance with one presently preferred embodiment of the invention.

FIGS. 1-9 illustrate a presently preferred embodiment of the present invention in the form of a machine 30 for compression molding sealing liners within plastic closure shells. Machine 30 includes a wheel 32 mounted on a shaft 34 (FIG. 1) between spaced supports 36. Shaft 34 is coupled by a pulley 38, a belt 40 and a gear box 42 to a motor 44 for rotating shaft 34 and wheel 32 around a horizontal axis. Other suitable wheel drive means can be employed. Wheel 32 includes a hub (which may be part of shaft 34) and a support 46 (FIGS. 3, 4 and 5) extending radially from the hub. Support 46 in the illustrated embodiment of the invention is in the form of a circular plate 48. Plate 48 has a plurality of radially outwardly opening peripheral pockets 49 in an equally spaced circumferential array. A rod 50 is slidably supported by sleeve bearings 52 within each pocket 49. A pair of cam rollers 54, 55 are rotatably mounted on a shaft 56 at the outer end of each rod 50 and receive lubricant through a fitting 58. Each shaft 56 is carried by a mounting block 62 secured at or adjacent to the outer end of rod 50. A stabilizer bar 60 extends from each mounting block 62 and cooperates with spaced rollers 64, 66 (FIG. 7) on plate 48 for preventing rotation of rod 50 within pocket 49.

Figure 2:
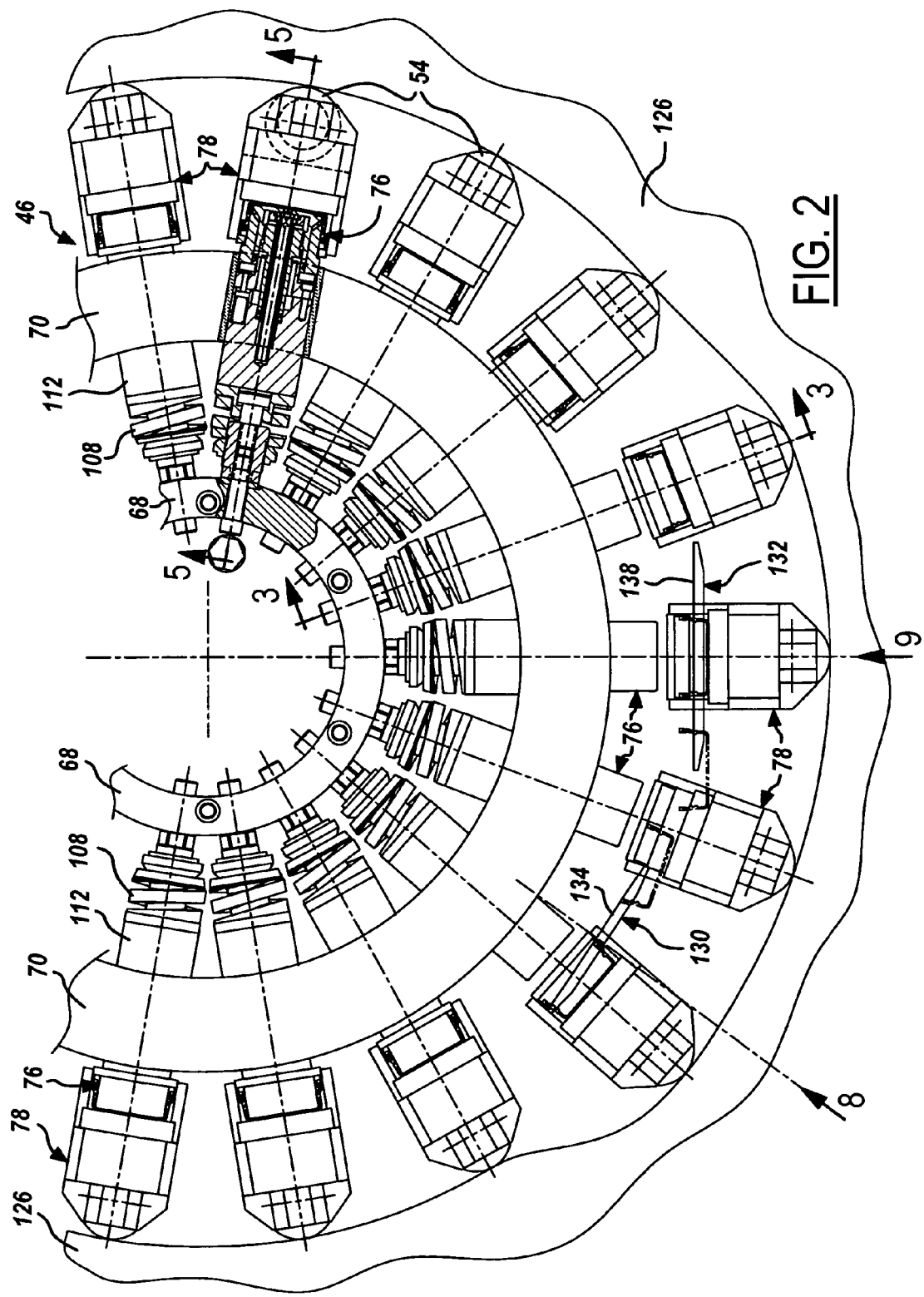
FIG. 2 is an enlargement of a lower portion of the machine in FIG. 1.
Figure 3:
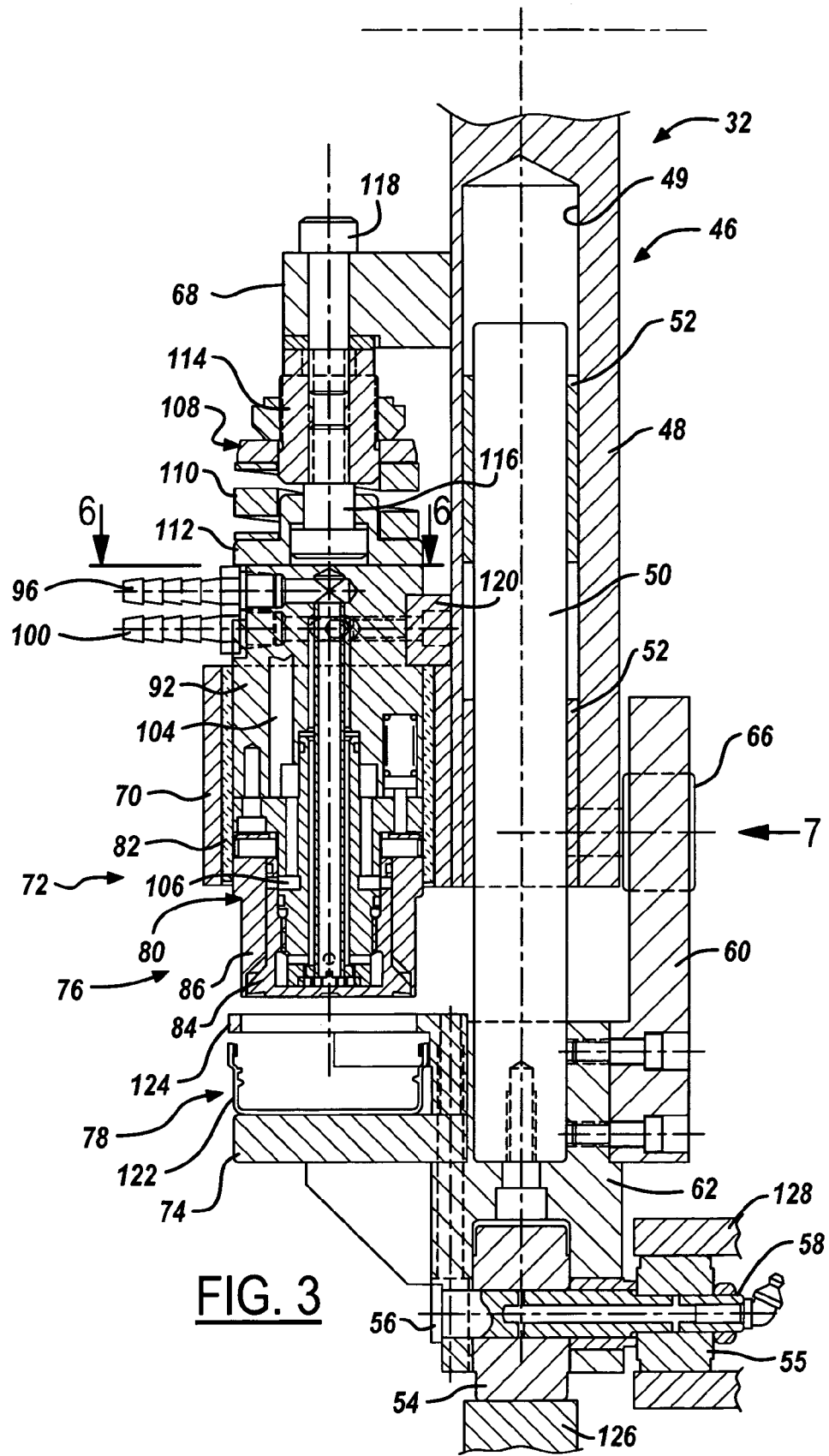
FIG. 3 is a sectional view taken substantially along the lines 3-3 in FIG. 2.
Figure 4:
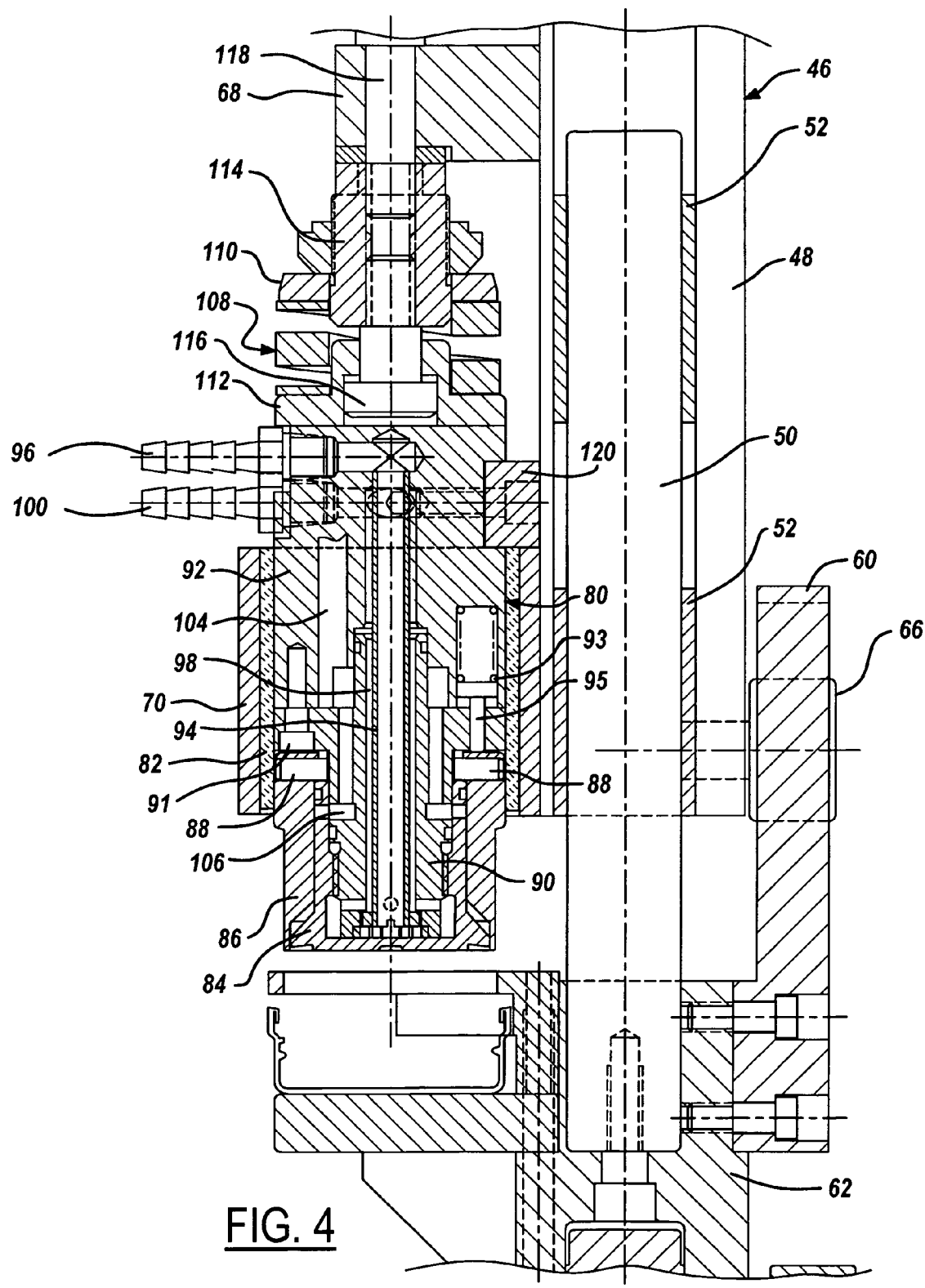
FIG. 4 is an enlargement of a portion of FIG. 3.

A pair of radially spaced external supports 68,70 are provided on support plate 48. As best seen in FIG. 2, supports 68,70 preferably are in the form of respective circumferentially continuous radially inner and outer annular support rings. A plurality of angularly spaced molds 72 are disposed around wheel 32, preferably adjacent to the periphery of the wheel. Each mold 72 includes a radially inner first mold segment 76 and a second mold segment 78 in radially outward alignment with an associated first mold segment 76. In the preferred embodiments of the invention, the radially inner first mold segment 76 is a male mold segment, and the radially outer second mold segment 78 is a female mold segment, although these mold segments could be reversed in accordance with the broadest principles of the present invention. Molds 72 preferably are identical. FIGS. 3 and 4 show mold 72 open, and FIG. 5 shows mold 72 closed.

Figure 5:
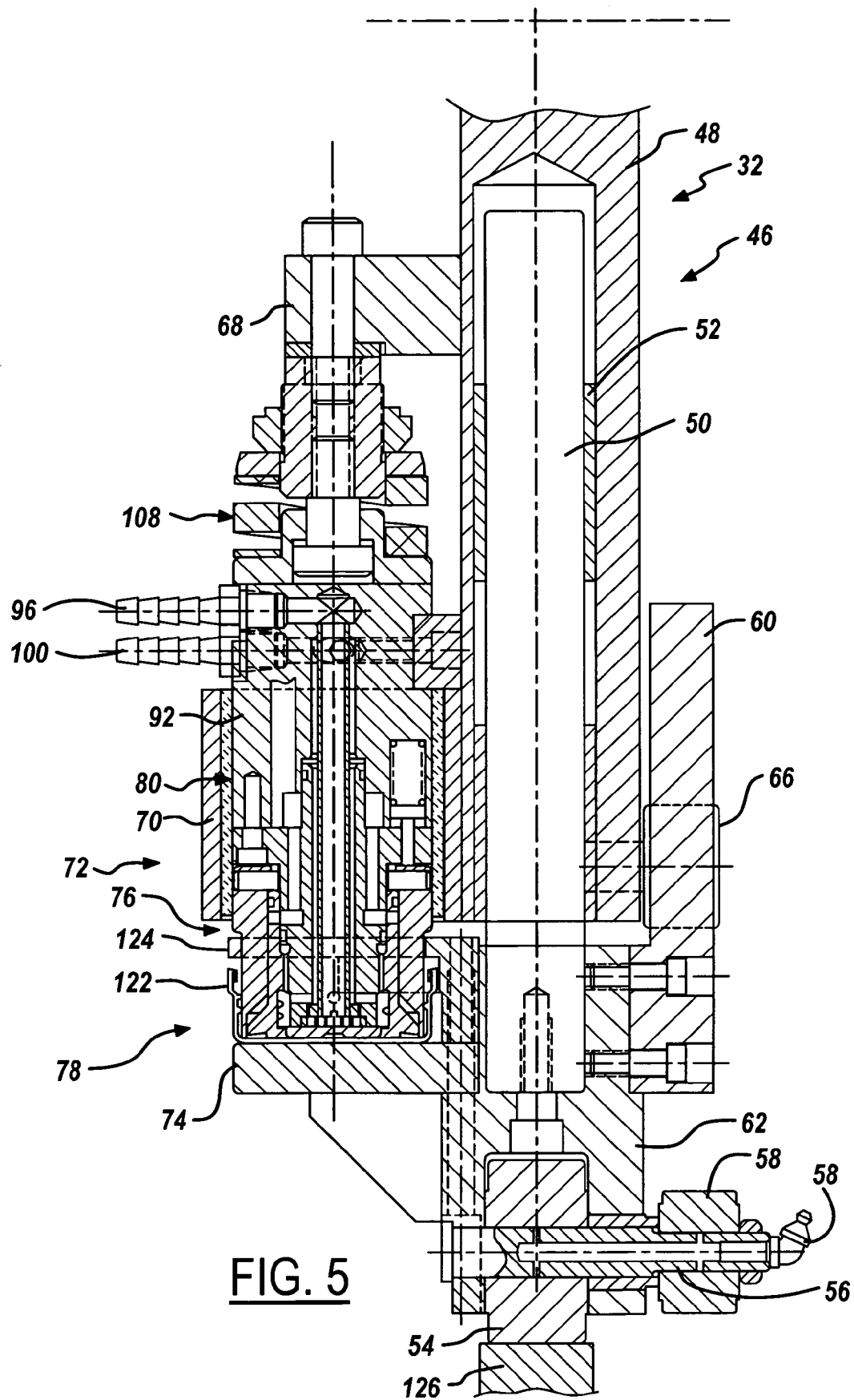
FIG. 5 is a sectional view taken substantially along the line 5-5 in FIG. 2.

Referring to FIGS. 3-5, male first mold segment 76 includes a core assembly 80 slidably mounted by a bearing 82 within a corresponding opening in outer support 70. Core assembly 82 includes a core tip 84 mounted on an inner pin 90, which is secured by screws 91 to a core manifold block 92 by springs 93 within pockets on the manifold block. Springs 93 cut through pins 95, which extend through openings in the base of inner pin 90, to engage the edge of collar 86. Pins 88 in collar 86 extend into slots on the skirt of tip 84 to limit outward movement of collar 86 with respect to tip 84. A coolant tube 94 extends from a first coolant fitting 96 on manifold block 92 through the hollow interior of pin 90 to a position adjacent to the inner face of tip 84. Coolant tube 90 is retained between the inner face of tip 84 and a counterbore in the end of pin 90. An annular passage 98, between pin 90 and the outer surface of tube 94, extends to a second coolant fitting 100 on block 92. Thus, coolant may be circulated from fitting 96 through tube 94 to the inner face of tip 84, and thence through passage 98 to fitting 100 (or in the opposite direction). A third fitting 102 (FIG. 6) is carried by manifold block 92 for selectively applying either vacuum or air under pressure through a passage 104 in block 92, through a passage 106 in pin 90, and then between sleeve 86 and tip 84. Fitting 102 may selectively be connected to vacuum for withdrawing air from the mold cavity during the compression molding operation to help reduce the occurrence of bubbles within the liner, and to air under pressure to assist removal of the closure and compression molded liner from the core assembly.

Figure 18:
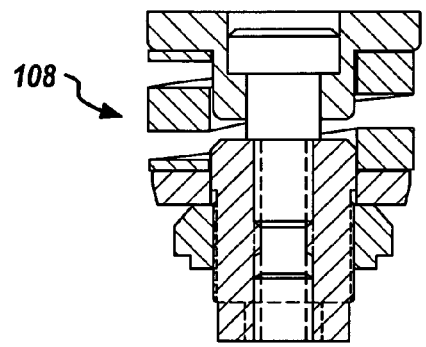
Figure 19:
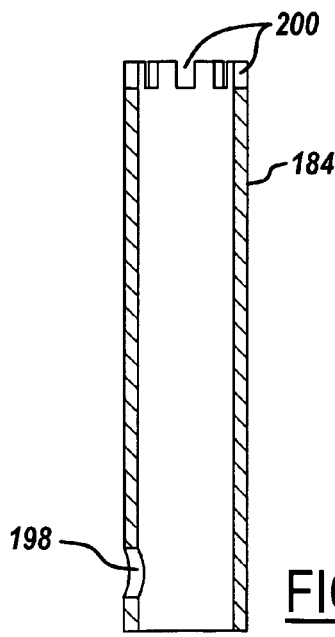
Figure 20:
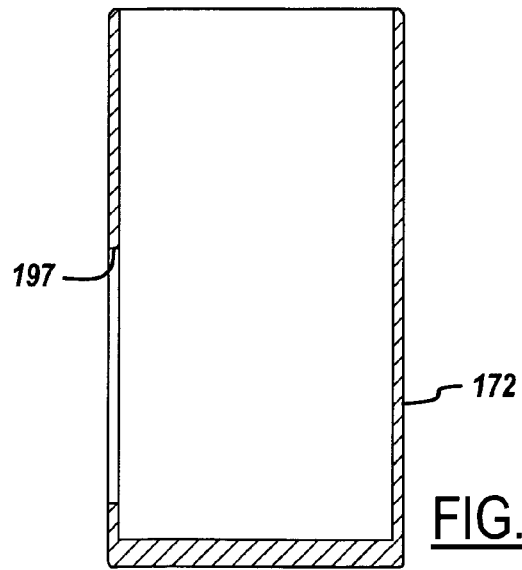
Figure 21:
Figure 22:
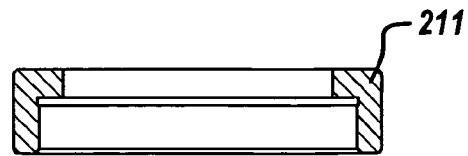

A spring 108 (FIGS. 3, 4 and 18) is disposed between manifold block 92 and support 68 on support plate 48. Spring 108 in the preferred embodiment of the invention includes a coil spring 110 captured in compression between a head 112 and a base 114. Head 112 is adjustable with respect to base 114 by means of a screw 116 for adjusting the force applied by spring 110. Base 114 is mounted on support 68 by means of a screw 118. Head 112 is in abutting engagement with the radially inner end of manifold block 92. A stop 120 is mounted on manifold block 92 for engagement with outer support 72 to form an outer stop to movement of mold core assembly 76 under the force of spring 108. As noted above, female second mold segment 78 is in the form of a nest, in which preformed closure shells 122 are placed on a platform 74 that is carried by block 62. A guide 124 is mounted on platform 74 for holding the shell in position. Guide 124 includes an opening for receiving core assembly 80 of male first mold segment 76 during radial inward motion of female second mold segment 78. Rollers 54, 55 on rod 50 and support block 62 engage cams 126, 128 (FIGS. 1-3 and 5) that are disposed adjacent to the periphery of wheel 32. Cam 126 extends around the periphery of wheel 32 to move female second mold segments to the closed position (FIG. 4) and hold the mold segments closed. Cam 128 is disposed adjacent to the lower portion of wheel 32 to pull second mold segments 78 open. (It will be appreciated that directional words such as "upper" and "lower" are employed by way of description and not limitation with respect to the upright orientation of machine 30 illustrated in FIG. 1. Directional words such as "radially inner" and "radially outer" are employed by way of description and not limitation with respect to the horizontal axis of wheel rotation).

Figure 8:
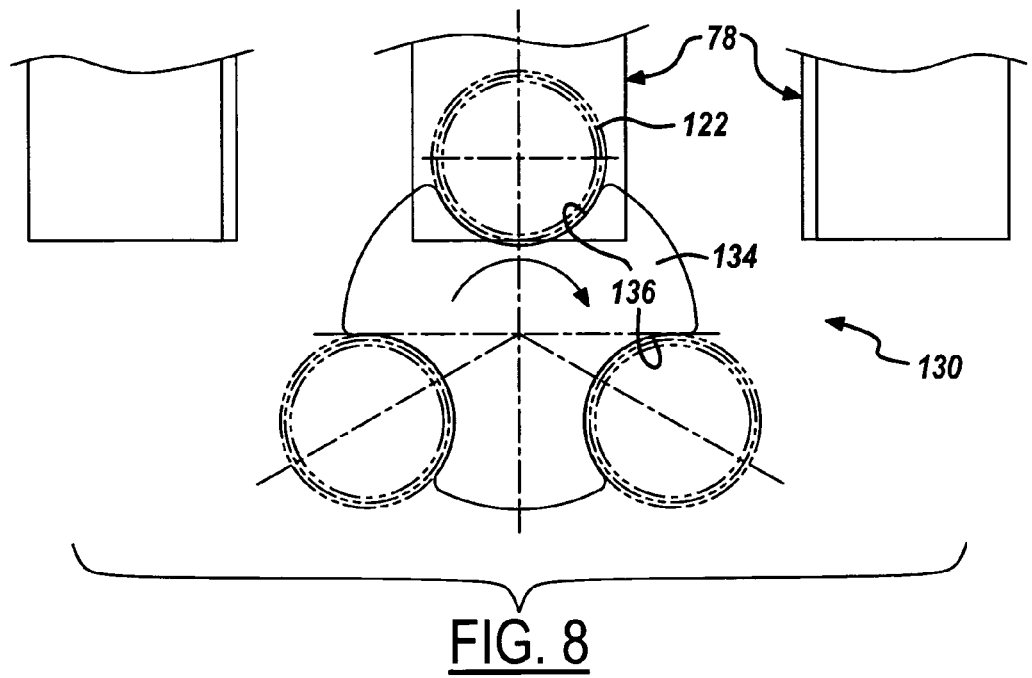
FIG. 8 is a schematic diagram of a molded part removal device, taken substantially from the direction 8 in FIG. 2.
Figure 9:
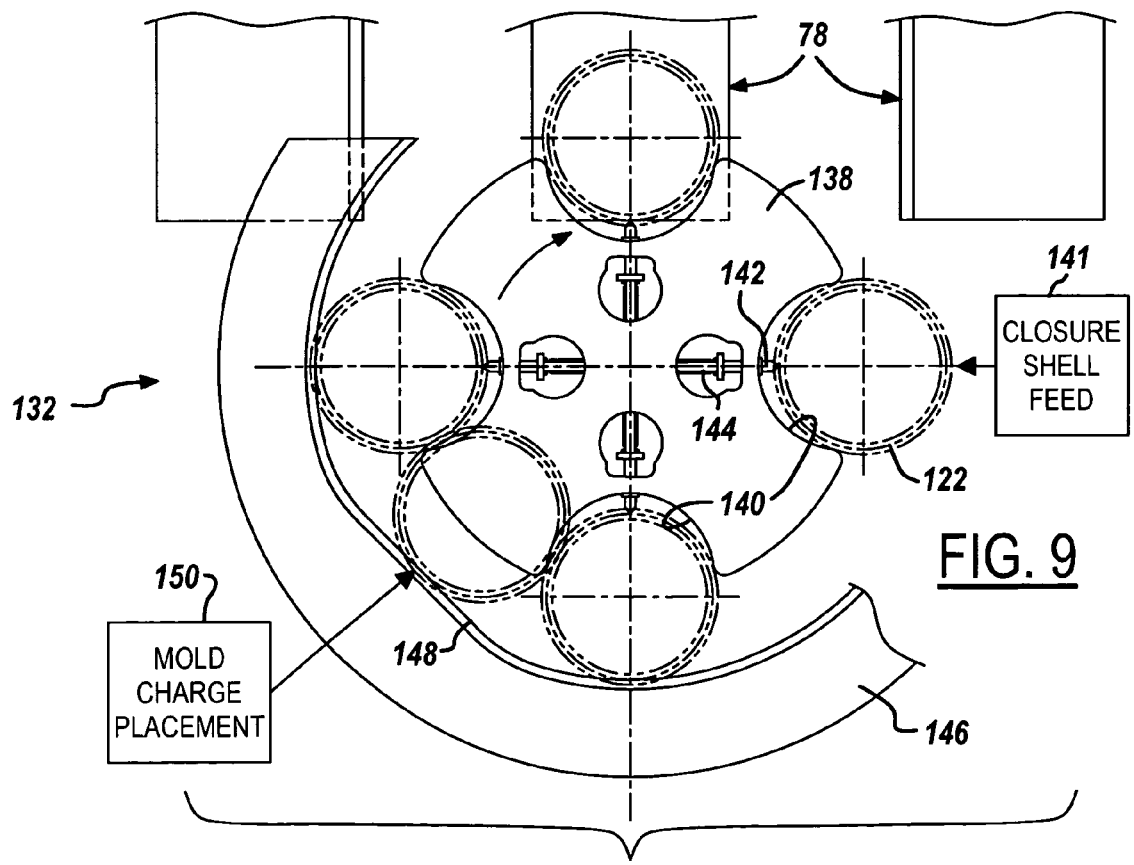
FIG. 9 is a schematic diagram of a mold charge placement device, being taken substantially from the direction 9 in FIG. 2.

Thus, as wheel 32 rotates in the clockwise direction in FIG. 1, the counterclockwise direction in FIG. 2 and into the page in FIGS. 3, 4 and 5, second mold segments 78 are pulled radially outwardly in sequence by cam 128 engaged with rollers 55, so that the second mold segments are opened radially outwardly with respect to first mold segments 76. With the mold segments open, closure shells 122, with sealing liners compression molded therein, are extracted from second mold segments 78 by a molded part removal device 130 (FIGS. 1, 2 and 8). A premade plastic closure shell is then placed within the nest of second mold segment 78 by a mold charge placement device 132 (FIGS. 1, 2 and 9). In this embodiment of the invention, the sealing liner mold charge is placed within the closure shell prior to placement of the shell into the nest. Continued rotation of wheel 32 functions through rollers 54 and cam 126 to close second mold segments 78 in sequence against first mold segments 76 to compression mold the charge of liner material within the closure shell. Springs 108 function to absorb excess force on first mold segments 76. The molds remain closed for cooling and set-up of the compression molded liner material until the molds are opened by cam 128 and rollers 55 as previously described.

FIG. 8 schematically illustrates an embodiment of molded part removal device 130 in accordance with a presently preferred embodiment of the invention. Device 130 includes a stripper wheel 134 having angularly spaced pockets 136 for receiving closure shells 122 from mold segments 78 as the mold segments pass in sequence with the molds open.

FIG. 9 schematically illustrates one embodiment of mold charge placement device 132 in accordance with the present invention. Device 132 includes a loader/placement wheel 138 having a circumferential array of angularly spaced pockets 140 for receiving premade closure shells in sequence from a shell infeed 141. A series of pins 142 are carried by wheel 138 and extends radially into respective pockets 140. A coil spring 144 is captured in compression between each pin 142 and wheel 138 for biasing the pin radially outwardly (with respect to the axis of wheel 138) into the associated pocket 140. A guide rail 146 surrounds at least a portion of the periphery of wheel 138. Guide rail 146 includes a portion 148 that is linear and tangential to the axis of rotation of wheel 138. A mold charge placement apparatus 150 is disposed adjacent to wheel 138 and guide rail 146 for placing charges of compression moldable resin liner material into each premade closure shell 122 as the closure shell is moved along portion 148 of guide rail 146. Thus, shells 122 are biased by pins 142 and springs 144 into engagement with the inner surface of guide rail 146. The mold charges are placed in the shells in sequence as the shells travel along linear portion 148 for enhanced control of mold charge placement, which preferably is in the center of each closure shell for enhanced flow of material during the compression molding operation. Mold charge placement apparatus may be of any suitable type, such as that disclosed in U.S. Pat. No. 5,603,964 for example. Wheel 134 in FIGS. 2 and 8, and wheel 138 in FIGS. 2 and 9, are rotated in synchronism with rotation of wheel 32 (FIG. 1).

Figure 10:
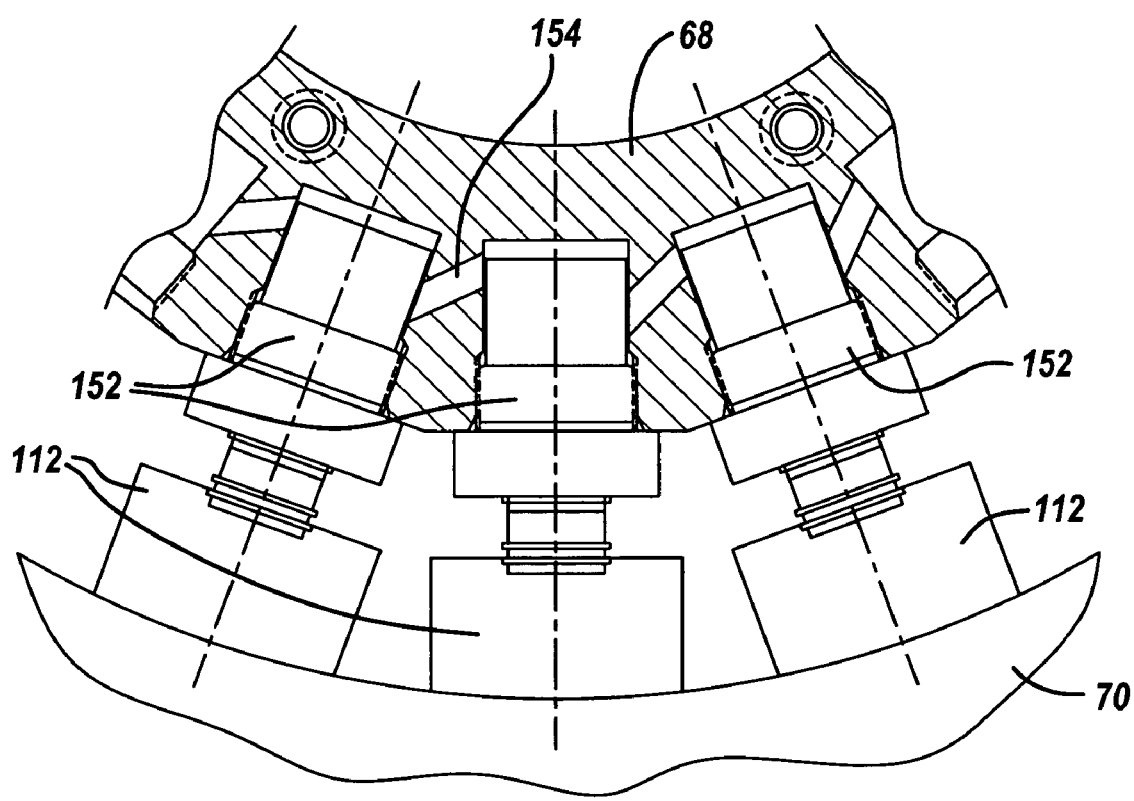
FIG. 10 is a fragmentary partially sectioned elevational view of a modification to the embodiment illustrated in FIGS. 1 and 2.
Figure 11:
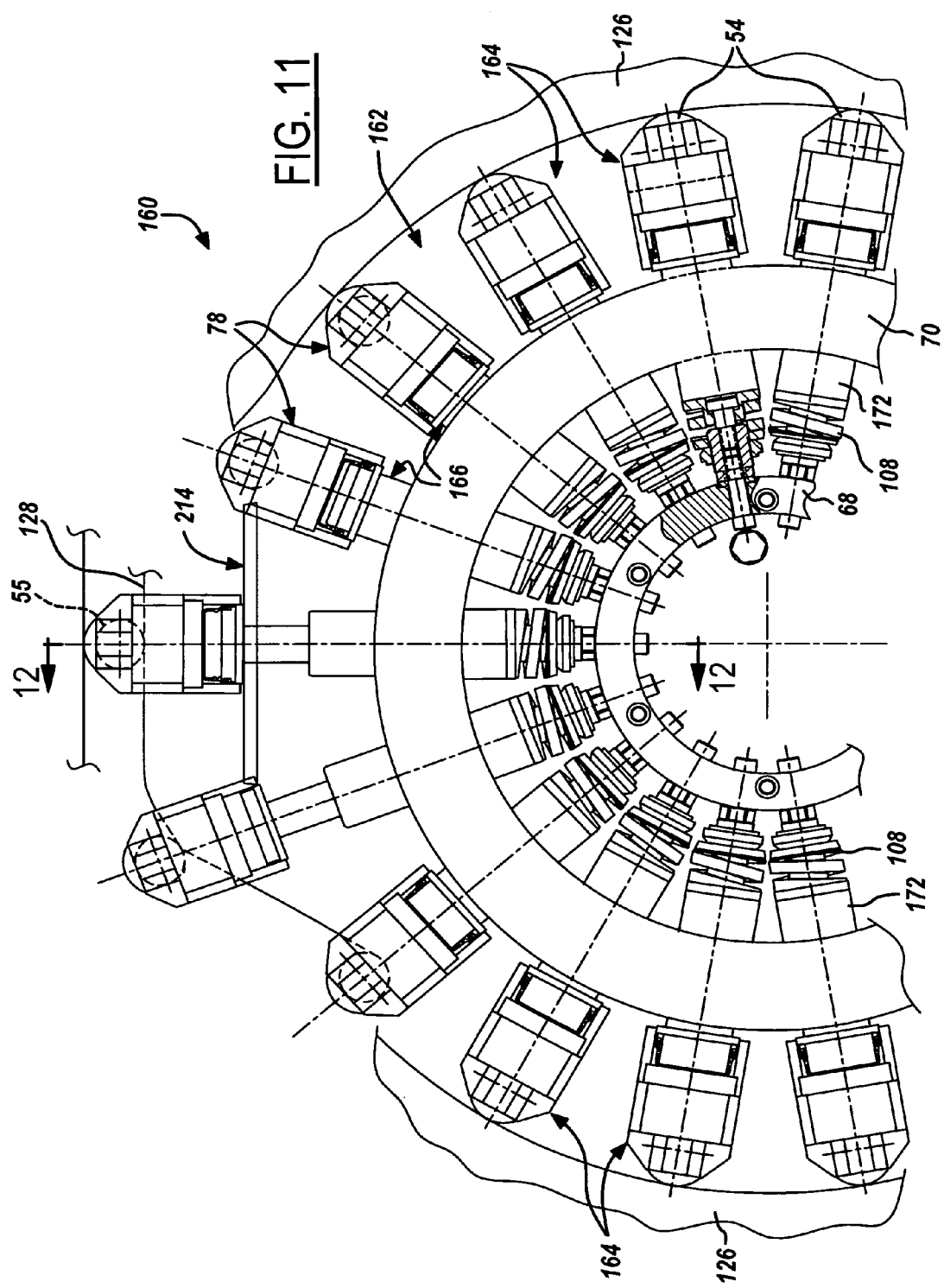
FIG. 11 is a fragmentary elevational view of a compression molding machine in accordance with another presently preferred embodiment of the invention.
Figure 12:
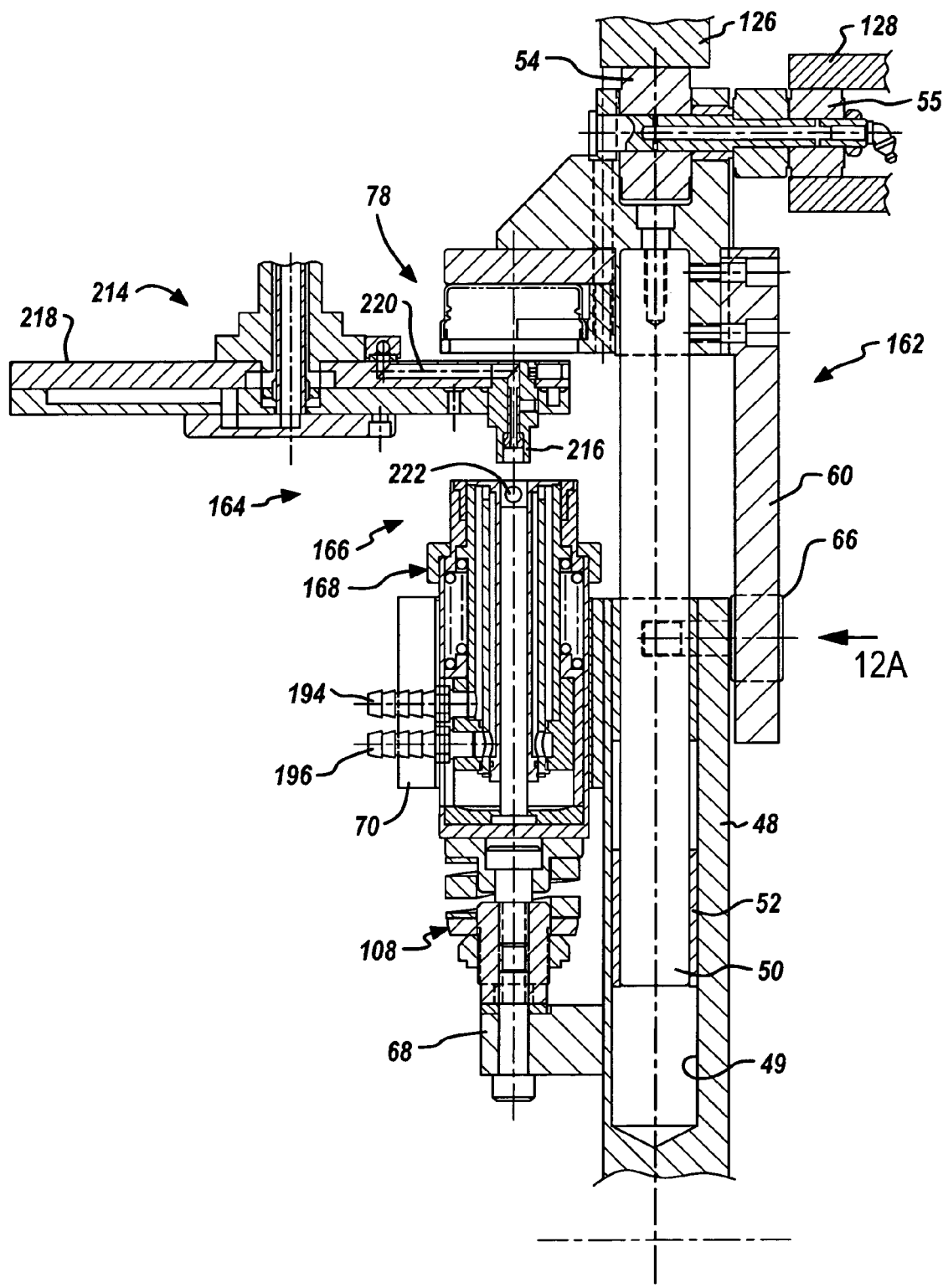
FIG. 12 is a fragmentary sectional view taken substantially along the line 12-12 in FIG. 11.
Figure 12A:
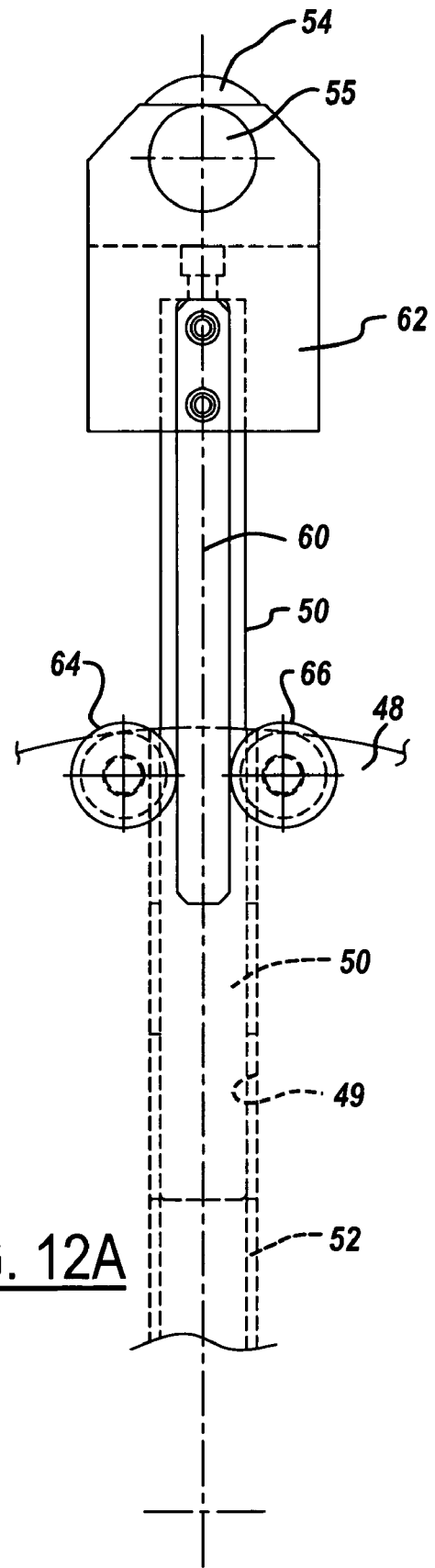
FIG. 12A is a fragmentary elevational view taken from the direction 12A in FIG. 12.

FIG. 10 illustrates a modification to the embodiment of FIGS. 2-5, in which the coil-type springs 108 in FIGS. 2-5 are replaced by gas springs 152, such as nitrogen gas springs. Gas springs 152 can be self-contained, or can be interconnected by passages 154 in inner support 68, with support 68 thus forming a spring gas manifold.

FIGS. 11-22 illustrate a machine 160 for compression molding sealing liners within premade closure shells in accordance with another embodiment of the invention. Machine 160 of FIGS. 11-22 differs from machine 30 of FIGS. 1-9 primarily in that the premade closure shells and the mold charges of liner material are inserted into the molds in sequence when the molds are open. That is, the mold charges are placed within the premade shells after the shells are inserted into the molds, preferably by placing the mold charges into pockets on the faces of the male first mold segments when the mold segments are open. Parts or elements in FIGS. 11-22 (and 23) that are identical or similar to corresponding parts or elements in the embodiment of FIGS. 1-9 (and 10) are indicated by correspondingly identical reference numerals. The description of the embodiments of FIGS. 11-22 and 23 will be addressed primarily to the differences between these embodiments and the embodiments of FIGS. 1-9 and 10.

Machine 160 includes wheel 162 that is rotatable around a horizontal axis. A plurality of molds 164 are disposed around wheel 162, preferably around the periphery of the wheel. Each mold 164 includes a first mold segment 166, preferably a male mold segment, and a second mold segment 78, preferably a female mold segment, disposed radially outwardly of the associated first mold segment 166. Female second mold segments 78 are engaged by cams 126, 128 disposed adjacent to wheel 162 to pull the female mold segments open to remove molded parts and insert shells and mold charges between the mold segments, and to push the female mold segments closed against the male mold segment to compression mold the liners. In machine 160, the molds are opened at the top of the wheel, rather than at the bottom of the wheel in FIGS. 1-9.

Figures 13, 14:
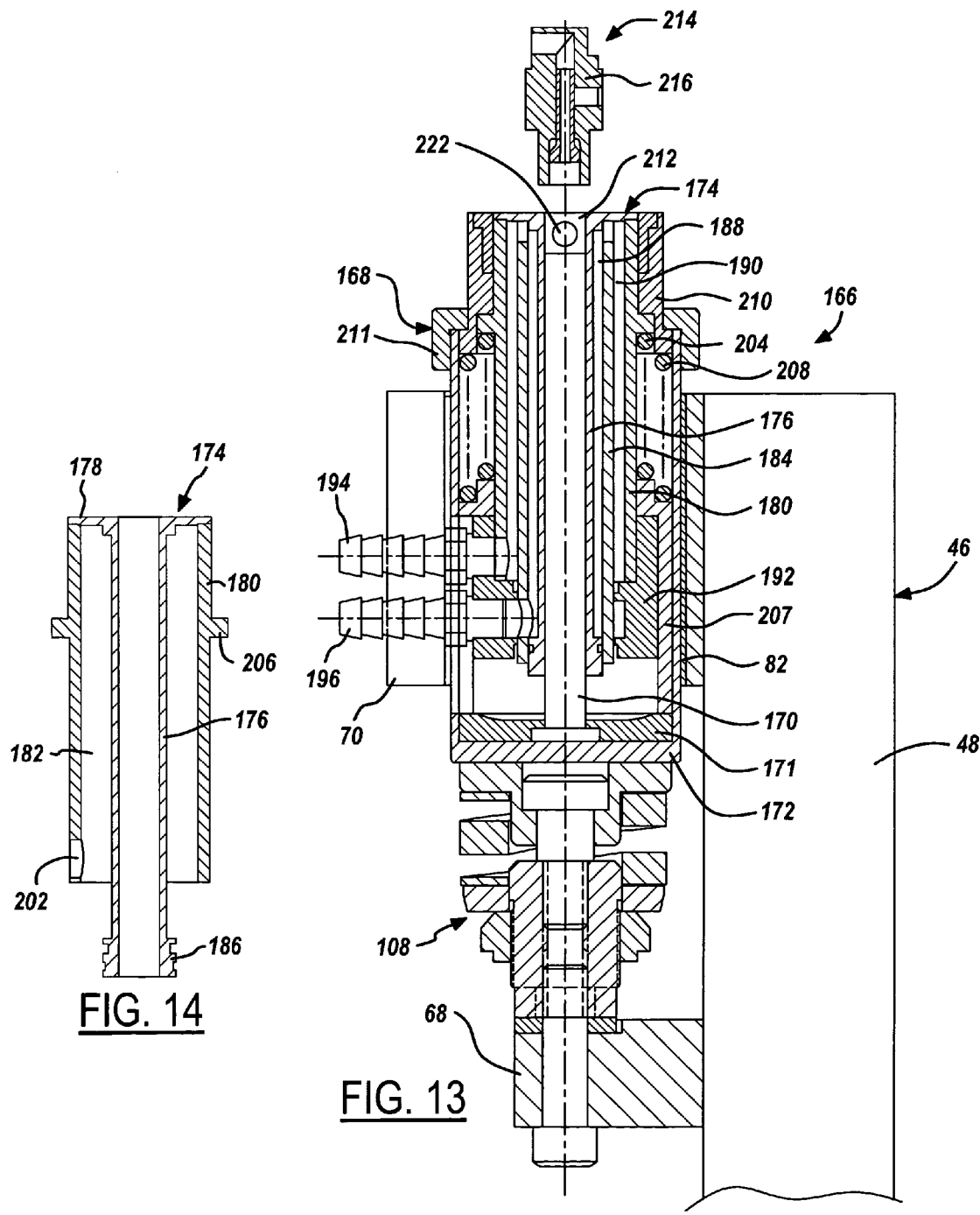
FIG. 13 is an enlargement of a portion of FIG. 12.
FIGS. 14-22 are sectional views of components in the mold core assembly illustrated in FIGS. 12 and 13.
Figure 15:
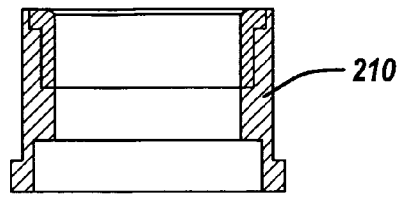
Figure 17:
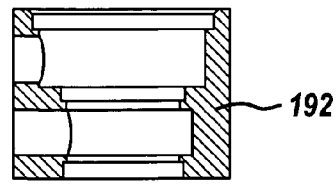
Figure 16:
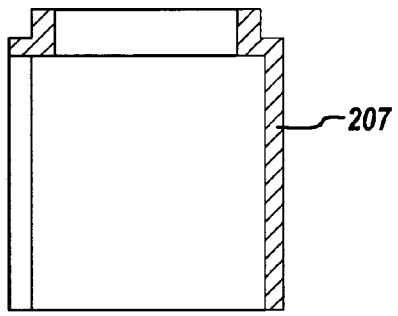

Mold segments 166 preferably are identical, and include a mold core assembly 168 slidably mounted on support 70 by bearings 82 and urged radially outwardly by springs 108. Each core assembly 168 includes a central core pin 170 mounted by a plate 171 (FIGS. 12, 13 and 21) within a support cup 172 (FIGS. 12-13 and 20) slidably engaged with bearing 82. A core sleeve 174 (FIGS. 12-14) slidably surrounds core pin 70. Core sleeve 174 is an assembly of an inner tube 176, which has a radially outwardly facing end wall 178, and an outer sleeve 180 that coaxially surrounds inner tube 176 and is secured to the outer periphery of end wall 178. The inner surface of inner tube 176 is slidably received on core pin 170, while an annular cavity 182 (FIG. 14) is formed between the outer surface of inner tube 176 and the surrounding outer sleeve 180. An intermediate sleeve 184 (FIGS. 12-13 and 19) is mounted to the outwardly flared inner end 186 of inner tube 176, and extends into annular cavity 182 so as to form in assembly an inner annular cavity 188 and an outer annular cavity 190 (FIG. 13).

A manifold block 192 (FIGS. 12-13 and 17) is mounted on the radially inner end of outer sleeve 180. A first fitting 194 is mounted on manifold block 192 in communication with outer annular passage 190. A second fitting 196 is mounted on manifold block 192 in communication with inner annular passage 188. Manifold block 192 is secured to the end of sleeve 180 and is slidable within a support sleeve 207. Support sleeve 207 (FIGS. 12-13 and 16) seats on plate 171 within support cup 172. Thus, coolant may be circulated from fitting 196 to inner annular passage 188 through an opening 198 adjacent to the radially inner end of intermediate sleeve 184, radially outwardly to outer annular passage 190 through passage 188 and a circumferential array of openings 200 at the opposing radially outer end of intermediate sleeve 184, radially inwardly along outer annular passage 190 through an opening 202 at the radially inner end of sleeve 180, and then through manifold block 192 to fitting 194. The flow direction can be reversed. Fittings 194, 196 extend laterally through an elongated opening 197 in support cup 172 to accommodate movement of manifold block 192 within support cup 172.

A first coil spring 204 (FIG. 13) is captured in compression between an outer flange 206 on sleeve 180 and the radially outer edge of support sleeve 207. Core sleeve 174 thus is biased by spring 204 radially outwardly with respect to core pin 170. A second coil spring 208 (FIG. 13) is captured in compression between an outer shoulder on support sleeve 207 and an outer collar 210 (FIGS. 12-13 and 15) surrounding the radially outer end of core sleeve 174. Outer collar thus is biased radially outwardly, with outward movement being limited by a stop ring 211 (FIGS. 12-13 and 22) secured over the end of support cup 172 to complete core assembly 168. When the mold segments are open (FIGS. 12 and 13), a pocket 212 is formed between the end of core pin 170 and surrounding core sleeve 174 urged radially outwardly by spring 204.

A mold charge placement device 214 (FIGS. 11-13) is disposed adjacent to wheel 164 for placing sequential mold charges into sequential pockets 212 as first mold segments 166 pass in sequence adjacent to the placement device. Mold charge placement device 214 is generally of the type disclosed in above-noted U.S. Pat. No. 5,603,964, the disclosure of which is incorporated herein by reference. A wheel 218 is rotatable around a vertical axis in synchronism with rotation of vertical mold wheel 162 and carries one or more nests 216. Nests 216 are connected by passages 220 in wheel 218 for application of vacuum and air under pressure to the interior of the nests. Nests 216 receive and cut mold charges from an extruder nozzle or the like (not shown), and carry the mold charges to a position overlying pockets 212 in mold segments 166 in sequence. At this position, air under pressure is applied to nest 216 so as to discharge the mold charge, illustrated schematically at 222 in FIGS. 12 and 13, into pocket 212.

Further rotation of wheel 162 clears pellet placement device 214, and second mold segment 78 is closed over first mold segment 166 by operation of cam 126 as previously described. After full rotation of wheel 164, as previously described, the closure shell with compression molded sealing liner is removed from the mold.

Figure 23:
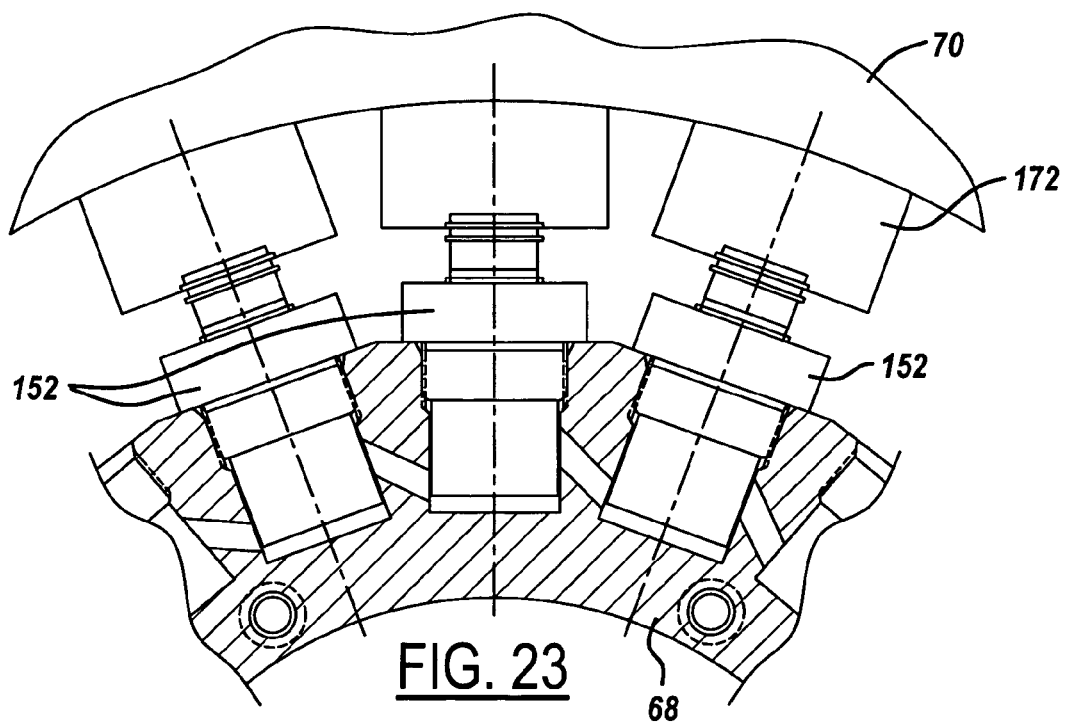
FIG. 23 is a fragmentary partially sectioned elevational view of a modification to the machine of FIG. 11.

FIG. 23 illustrates a modification to the embodiment of FIGS. 1-22, in which coil-type springs 108 are replaced by gas springs 152, such as nitrogen gas springs.

There thus have been disclosed an apparatus and method for compression molding sealing lines within premade closure shells, which fully satisfy all of the objects and aims previously set forth. The invention has been described in conjunction with several presently preferred embodiments, and a number of additional modifications and variations have been discussed. Other modifications and variations readily will suggest themselves to persons of ordinary skill in the art. The invention is intended to embrace all such modifications and variations as fall within the spirit and broad scope of the appended claims.

The invention claimed is:

1. Apparatus for compression molding sealing liners in closure shells, which includes:
   a shell loader for presenting premade closure shells in sequence,
   a mold charge placement device for placing mold charges of liner material into the premade shells, and
   a molding machine for receiving closure shells in sequence from said loader and compression molding the mold charges to form sealing liners within the closure shells,
   wherein said molding machine is a vertical wheel molding machine that includes
      a wheel mounted for rotation around a horizontal axis and a plurality of angularly spaced molds disposed around said wheel,
      each of said molds including a first mold segment and a second mold segment disposed radially outwardly of said first mold segment, and
      one of said first and second mold segments includes a nest for receiving a premade closure shell, and the other of said first and second mold segments includes a core for engaging and compression molding a mold charge within the shell, and
   wherein said mold charge placement device places mold charges into the premade closure shells in sequence prior to placement of the shells into said nests.

2. The apparatus set forth in claim 1 including means for moving said second mold segments in sequence radially inwardly and outwardly as said wheel rotates around said axis.

3. The apparatus set forth in claim 2 wherein said means includes at least one cam disposed adjacent to said wheel for engaging said second mold segments in sequence as said wheel rotates around said axis.

4. The apparatus set forth in claim 1 wherein said wheel includes a radially extending support on which said molds are mounted.

5. The apparatus set forth in claim 4 wherein said molds are mounted adjacent to a periphery of said support.

6. The apparatus set forth in claim 5 wherein said support includes a plurality of angularly spaced radially outwardly opening pockets, and wherein said second mold segments are mounted on rods slidably carried in said pockets.

7. The apparatus set forth in claim 4 wherein each of said first mold segments is mounted between radially spaced inner and outer supports.

8. The apparatus set forth in claim 7 wherein each of said first mold segments is slidably mounted in said radially outer support and is coupled by a spring to said radially inner support.

9. The apparatus set forth in claim 8 wherein said spring comprises a coil spring or a gas spring.

10. The apparatus set forth in claim 1 wherein said second mold segments include said nests and said first mold segments include said cores.

11. The apparatus set forth in claim 1 wherein said mold charge placement device includes:
    a placement wheel rotatable around a vertical axis in synchronism with rotation of said vertical wheel around said horizontal axis, said placement wheel having peripheral pockets for receiving the closure shells in sequence,
    a guide rail surrounding at least a portion of said placement wheel, and
    springs on said placement wheel for engaging shells in said pockets and urging the shells against said guide rail to locate the shells relative to the two said mold charge placement device.

12. The apparatus set forth in claim 11 wherein said guide rail includes a portion that is linear and tangential to said vertical axis so that the shells travel in a linear path along said portion of said guide rail adjacent to said mold charge placement device.

13. The apparatus set forth in claim 11 wherein said springs engage pins carried by said placement wheel for urging the shells against said guide rail.

14. Apparatus for compression molding sealing liners in closure shells, which includes:
    a shell loader for presenting premade closure shells in sequence,
    a mold charge placement device for placing mold charges of liner material into the premade shells, and
    a molding machine for receiving closure shells in sequence from said loader and compression molding the mold charges to form sealing liners within the closure shells,
    wherein said molding machine is a vertical wheel molding machine that includes
       a wheel mounted for rotation around a horizontal axis and a plurality of angularly spaced molds disposed around said wheel,
       each of said molds including a first mold segment and a second mold segment disposed radially outwardly of said first mold segment
    wherein said mold charge placement device places mold charges into the premade closure shells in sequence after placement of the shells into said nests, and wherein said mold charge placement device places mold charges onto said cores in sequence, with said cores placing said mold charges into said premade shells when said second mold segment and nest are closed against said core.

15. The apparatus set forth in claim 14 wherein each of said cores includes:
    a core pin coupled to said wheel,
    a core sleeve surrounding said core pin, and
    a spring biasing said core sleeve radially outwardly with respect to said core pin to form a pocket between said core pin and said core sleeve for receiving a mold charge,
    closure of such second mold segment against said first mold segment moving said core sleeve against said spring to reduce said pocket and compression mold the mold charge.

16. The apparatus set forth in claim 15 including means for directing coolant through said core sleeve to cool said core.

17. The apparatus set forth in claim 16 wherein said core sleeve forms an annular coolant cavity, wherein said core includes an intermediate sleeve positioned to divide said annular coolant cavity into inner and outer annular coolant cavities, said intermediate sleeve including passages for feeding coolant between said inner and outer annular coolant cavities.

18. The apparatus set forth in claim 1 wherein each of said cores includes a passage for application of vacuum at a tip of said core to remove air during compression molding of the mold charge.

19. Apparatus for compression molding sealing liners in premade closure shells, which includes:
   a vertical wheel molding machine including a wheel mounted for rotation around a horizontal axis and a plurality of angularly spaced molds disposed around said wheel,
   each of said molds including a first mold segment and a second mold segment disposed radially outwardly of said first mold segment,
   one of said first and second mold segments including a nest for receiving a premade closure shell, and the other of said first and second mold segments including a core for engaging and compression molding a mold charge within the shell,
   a mold charge placement device for placing mold charges of liner material into premade closure shells in sequence, and
   a shell loader for loading the premade closure shells with mold charges into said mold in sequence as said wheel rotates around said axis
   wherein said mold charge placement device places mold charges into the premade closure shells in sequence prior to placement of the shells into said nests.

20. The apparatus set forth in claim 19 wherein said second mold segments include said nests and said first mold segments include said cores.

21. The apparatus set forth in claim 19 wherein said mold charge placement device includes:
   a placement wheel rotatable around a vertical axis in synchronism with rotation of said vertical wheel around said horizontal axis, said placement wheel having peripheral pockets for receiving the closure shells in sequence,
   a guide rail surrounding at least a portion of said placement wheel, and
   springs on said placement wheel for engaging shells in said pockets and urging the shells against said guide rail to locate the shells relative to the two said mold charge placement device.

22. The apparatus set forth in claim 21 wherein said guide rail includes a portion that is linear and tangential to said vertical axis so that the shells travel in a linear path along said portion of said guide rail adjacent to said mold charge placement device.

23. The apparatus set forth in claim 21 wherein said springs engage pins carried by said placement wheel for urging the shells against said guide rail.

24. The apparatus set forth in claim 20 including at least one cam disposed adjacent to said wheel for engaging said second mold segments in sequence as said wheel rotates around said axis and moving said second mold segments radially inwardly and outwardly with respect to the associated first mold segments.

25. The apparatus set forth in claim 20 wherein each of said cores includes a passage for application of vacuum at a tip of said core to remove air during compression molding of the mold charge.

26. Apparatus for compression molding sealing liners in premade closure shells, which includes:
   a vertical wheel molding machine including a wheel mounted for rotation around a horizontal axis and a plurality of angularly spaced molds disposed around said wheel,
   each of said molds including a first mold segment and a second mold segment disposed radially outwardly of said first mold segment,
   one of said first and second mold segments including a nest for receiving a premade closure shell, and the other of said first and second mold segments including a core for engaging and compression molding a mold charge of liner material within the shell,
   a shell loader for loading premade closure shells into said molds in sequence as said wheel rotates around said axis, and
   a mold charge placement device for placing mold charges of liner material into said premade shells in sequence after the shells are loaded into said molds
   wherein said mold charge placement device places mold charges onto said cores in sequence, with said cores placing said mold charges into said premade shells when said second mold segment and nest are closed against said core.

27. The apparatus set forth in claim 26 wherein each of said cores includes:
   a core pin coupled to said wheel,
   a core sleeve surrounding said core pin, and
   a spring biasing said core sleeve radially outwardly with respect to said core pin to form a pocket between said core pin and said core sleeve for receiving a mold charge,
   closure of such second mold segment against said first mold segment moving said core sleeve against said spring to reduce said pocket and compression mold the mold charge.

28. The apparatus set forth in claim 26 including means for directing coolant through said core sleeve to cool said core.

29. The apparatus set forth in claim 28 wherein said core sleeve forms an annular coolant cavity, wherein said core includes an intermediate sleeve positioned to divide said annular coolant cavity into inner and outer annular coolant cavities, said intermediate sleeve including passages for feeding coolant between said inner and outer annular coolant cavities.

30. The apparatus set forth in claim 19 including at least one cam disposed adjacent to said wheel for engaging said second mold segments in sequence as said wheel rotates around said axis and moving said second mold segments radially inwardly and outwardly with respect to the associated first mold segments.

31. A machine for compression molding sealing liners within premade closure shells, which includes:
   a wheel mounted for rotation around a horizontal axis and a plurality of angularly spaced molds disposed around said wheel,
   each of said molds including a male mold segment and a female mold segment disposed radially outwardly of a said male mold segment,
   each of said female mold segments being movable radially with respect to the associated male mold segment between a radially inner closed position with said male mold segment and a radially outer open position spaced from said male mold segment, a shell loader for loading premade closure shells onto said female mold segments in said open position of said female mold segments, and a mold charge placement device for placing mold charges of liner material onto said male mold segments in said open portion of said mold segments, such that movement of said second mold segment to said closed position compression molds the mold charge to form a sealing liner with the closure shell.

32. The machine set forth in claim 31 including at least one cam disposed adjacent to a periphery of said wheel for moving said female mold segments in sequence between said open and closed positions.

33. The machine set forth in claim 31 wherein each of said male mold segments includes:

a core pin mounted on said wheel, a core sleeve slidably surrounding said core pin, and a spring biasing said core sleeve radially outwardly with respect to said core pin to form a pocket between said core pin and said sleeve for receiving the mold charges when said mold segments are in said open position, closure of said female mold segment against said male molded segment moving said core sleeve against said spring to reduce said pocket and compression mold the mold charge.

\* \* \* \* \*